US006090446A

United States Patent [19]

Nakashima et al.

[11] Patent Number: 6,090,446

[45] Date of Patent: Jul. 18, 2000

[54] METHOD OF FORMING PARTICLE LAYER ON SUBSTRATE, METHOD OF PLANARIZING IRREGULAR SURFACE OF SUBSTRATE AND PARTICLE-LAYER-FORMED SUBSTRATE

[75] Inventors: Akira Nakashima; Michio Komatsu; Kenji Ohno; Kuniharu Teramoto; Kazuaki Inoue, all of Kitakyushu, Japan

[73] Assignee: Catalysts & Chemicals Industries Co., Ltd., Tokyo, Japan

[21] Appl. No.: 08/624,537

[22] PCT Filed: Aug. 11, 1995

[86] PCT No.: PCT/JP95/01610

§ 371 Date: Apr. 12, 1996

§ 102(e) Date: Apr. 12, 1996

[87] PCT Pub. No.: WO96/04998

PCT Pub. Date: Feb. 22, 1996

[30] Foreign Application Priority Data

Aug. 15, 1994 [JP] Japan .................................... 6-213148

[51] Int. Cl.$^7$ .............................. B05D 5/00; B05D 1/18; B32B 3/00

[52] U.S. Cl. ............................ 427/277; 427/58; 427/162; 427/180; 427/271; 427/355; 427/430.1; 428/143; 428/206

[58] Field of Search ................................ 427/430.1, 180, 427/162, 271, 58, 355, 277; 428/143, 206

[56] References Cited

U.S. PATENT DOCUMENTS

| | | | |
|---|---|---|---|
| 2,633,426 | 3/1953 | Koller . | |
| 4,051,275 | 9/1977 | Forestek | 427/180 |
| 4,816,290 | 3/1989 | Heki et al. | 427/430.1 |
| 5,505,996 | 4/1996 | Nagayama | 427/123 |

FOREIGN PATENT DOCUMENTS

| | | |
|---|---|---|
| 0197461 | 10/1986 | European Pat. Off. . |
| 0270212 | 6/1988 | European Pat. Off. . |
| 0595606 | 5/1994 | European Pat. Off. . |
| 63-52132 | 3/1988 | Japan . |
| 2307571 | 12/1990 | Japan . |
| 3157162 | 7/1991 | Japan . |

OTHER PUBLICATIONS

"Hyomen" (surface), vol. 31, No. 5, pp. 11–18, 1993 (No Mo.).

Karl–Ulrich Fulda and Bernd Tieke, *Materials Communications, Advanced Materials*, Apr. 6, 1994, No. 4, Weinheim, DE (Germany), pp. 288–290.

*Primary Examiner*—Janyce Bell

*Attorney, Agent, or Firm*—Webb Ziesenheim Logsdon Orkin & Hanson, P.C.

[57] ABSTRACT

The present invention provides a method of forming on a substrate a particle layer highly adherent to the substrate, which comprises the steps of spreading a dispersion (I) comprising a dispersing medium and, dispersed therein, solid particles being surface treated with a compound acting as a binder on a liquid (II) having a specific gravity higher than that of the dispersing medium, said liquid (II) being immiscible with the dispersing medium, subsequently removing the dispersing medium from the dispersion (I) to thereby arrange the solid particles on the liquid (II) so that a particle layer is formed on the liquid (II) and thereafter transferring the particle layer onto a substrate. Moreover, the present invention provides a method of planarizing an irregular surface of a substrate, which comprises transferring the above particle layer to an irregular surface of a substrate and removing parts of the particle layer formed on protrudent parts of the substrate to thereby planarize the irregular surface of the substrate and also provides a particle-layer-formed substrate comprising a substrate and, superimposed on a surface thereof, the particle layer obtained by each of the above methods.

8 Claims, 2 Drawing Sheets

METHOD OF FORMING PARTICLE LAYER ON SUBSTRATE, METHOD OF PLANARIZING IRREGULAR SURFACE OF SUBSTRATE AND PARTICLE-LAYER-FORMED SUBSTRATE

TECHNICAL FIELD

The present invention relates to a method of forming a particle layer on a substrate, a method of planarizing (flattening) an irregular surface of a substrate and a particle-layer-formed substrate. More particularly, the present invention is concerned with a method of forming on a substrate a particle layer highly adherent to the substrate, a method of planarizing an irregular surface of a substrate in which a particle layer is provided in recessed parts of the irregular surface of the substrate and a particle-layer-formed substrate having excellent adherence between the particle layer and the substrate.

BACKGROUND ART

The Langmuir-Blodgett's technique is known as a method of forming a monomolecular film on a substrate.

In this technique, the monomolecular film is formed on the substrate by spreading a monomolecular film on a gas-liquid interface and transferring the monomolecular film onto a substrate. A compound having a surface activity, for example, a compound having hydrophilic and hydrophobic groups in its molecule is used as a compound for forming the monomolecular film.

On the other hand, the following methods are generally known for forming on a substrate a particle layer from solid particles having no surface activity.

(1) The one method comprises spreading on a substrate a dispersion comprising a dispersing medium and, dispersed therein, solid particles, for example, a spherical-polystyrene suspension (latex) and thereafter evaporating the dispersing medium to thereby form a two-dimensional crystal layer, for example, a monoparticulate layer (Hyomen (surface), Vol. 31, No. 5, pp. 11–18 (1993)).

(2) The other method comprises contacting a dispersion comprising a dispersing medium and, dispersed therein, solid particles with a liquid immiscible with the dispersing medium to thereby cause the liquid-liquid interface to adsorb the solid particles of the dispersion so that a monoparticulate layer is formed at the interface and thereafter transferring the monoparticulate layer onto a substrate to thereby form the monoparticulate layer on the substrate (Japanese Patent Laid-open Publication No. 2(1990)-307571).

However, the formation of the particle layer on the substrate according to the above methods encounters problems such that the resultant particle layer is inferior in adhesion to the substrate.

With respect to semiconductor devices or electronic devices having multilevel interconnection structures, an irregular surface (step) on the substrate is formed during the respective manufacturing processes, so that occasionally the planarizing of the step is required.

For example, each layer of a semiconductor device having multilevel interconnection structure has a step between wiring and nonwiring parts thereof, so that the step must be eliminated to thereby attain planarizing prior to formation of an upper wiring layer. Further, with respect to a color-filter-formed transparent electrode plate of a liquid crystal color display device, the step of the color filter must be eliminated, to thereby attain planarizing during the process of manufacturing the same. Still further, with respect to a TFT-formed transparent electrode plate for use in liquid crystal displays and the like, it is needed to eliminate the step of the TFT formed thereon to thereby attain planarizing during the process of manufacturing the same.

The present invention has been made in the above circumstances. Thus, objects of the present invention are to provide a method of forming on a substrate a particle layer highly adherent to the substrate, a method of planarizing an irregular surface of a substrate and a particle-layer-formed substrate having a highly adherent particle layer formed on a substrate.

DISCLOSURE OF THE INVENTION

The method of forming a particle layer on a substrate according to the present invention comprises the steps of spreading a dispersion (I) comprising a dispersing medium and, dispersed therein, solid particles being surface treated with a compound acting as a binder on a liquid (II) having a specific gravity higher than that of the dispersing medium, said liquid (II) being immiscible with the dispersing medium, subsequently removing the dispersing medium from the dispersion (I) to thereby arrange the solid particles on the liquid (II) so that a particle layer is formed on the liquid (II) and thereafter transferring the particle layer onto a substrate.

The method of planarizing an irregular surface of a substrate according to the present invention comprises the steps of spreading a dispersion (I) comprising a dispersing medium and, dispersed therein, solid particles being surface treated with a compound acting as a binder on a liquid (II) having a specific gravity higher than that of the dispersing medium, said liquid (II) being immiscible with the dispersing medium, subsequently removing the dispersing medium from the dispersion (I) to thereby arrange the solid particles on the liquid (II) so that a particle layer is formed on the liquid (II), then transferring the particle layer onto an irregular surface of a substrate and thereafter removing parts of the particle layer formed on protrudent parts of the substrate to thereby cause the particle layer to remain at recessed parts of the substrate.

The particle-layer-formed substrate of the present invention comprises a substrate and, superimposed on a surface thereof, the particle layer obtained by each of the above methods.

Figure 1A:
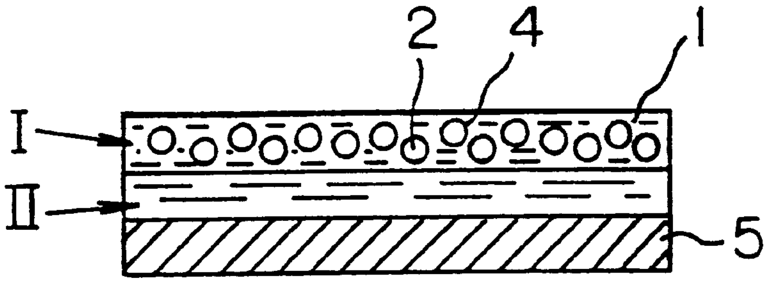
FIG. 1 (*a*), 1(*b*) and 1(*c*) are views for explaining the particle layer forming method of the present invention.

I: dispersion (I), II: liquid (II), 1: dispersing medium, 2: solid particles 3: particle layer, 4: binder, 5: substrate

BEST MODE FOR CARRYING OUT THE INVENTION

Method of Forming Particle Layer

First, the particle layer forming method of the present invention will be illustrated below.

The method of forming a particle layer on a substrate according to the present invention comprises the steps of spreading a dispersion (I) comprising a dispersing medium and, dispersed therein, solid particles being surface treated with a compound acting as a binder on a liquid (II) having a specific gravity higher than that of the dispersing medium, said liquid (II) being immiscible with the dispersing medium, subsequently removing the dispersing medium from the dispersion (I) to thereby arrange the solid particles on the liquid (II) so that a particle layer is formed on the liquid (II) and thereafter transferring the particle layer onto a substrate.

Particles of an inorganic compound such as $SiO_2$, $TiO_2$, $ZrO_2$ or SiC or particles of a synthetic resin such as polystyrene are used as solid particles in the formation of the above dispersion (I).

The particle size of the above particles is preferred to range from about 100 Å to about 100 μm though depending on the purpose of the formation of the particle layer on the substrate and the use of the substrate having the particle layer formed thereon.

The solid particles are used in varied form, for example, spherical, rod-shaped or fibrous form, depending on the purpose of the formation of the particle layer on the substrate and the use of the substrate having the particle layer formed thereon. In particular, when forming the particle layer on the substrate according to the method of the present invention with the use of the dispersion (I) comprising the dispersing medium and, dispersed therein, spherical particles having uniform particle size as the solid particles, a uniform monoparticulate layer of regularly arranged solid particles can be obtained on the substrate.

In the present invention, the dispersion (I) is prepared by surface treating the above solid particles with a compound acting as a binder and thereafter dispersing them in the dispersing medium.

Example of compound acting as a binder include a film forming component of a film forming coating solution, for instance, an organosilicon compound represented by the formula:

$$R_nSi(OR')_{4-n}$$

wherein R and R' may be identical with or different from each other and each thereof represents a hydrogen atom, an alkyl group having 1 to 8 carbon atoms, an aryl group or a vinyl group, and n is an integer of 0 to 3.

Examples of the above organosilicon compounds include tetramethoxysilane, tetraethoxysilane, tetraisopropoxysilane, tetraoctylsilane, methyltrimethoxysilane, methyltriethoxysilane, ethyltriethoxysilane, methyltriisopropoxysilane, dimethyldimethoxysilane, methyltributoxysilane, octyltriethoxysilane, phenyltrimethoxysilane, vinyltrimethoxysilane, diethoxysilane and triethoxysilane.

In the present invention, any of β-diketone compounds such as dibutoxybisacetylacetonatozirconium, tributoxymonoacetylacetonatozirconium and dibutoxybisacetylacetonatotitanium and metal carboxylate such as tin octylate, aluminum octylate and tin laurylate can also be used as the compound acting as a binder.

Further, in the present invention, polysilazane is used as the compound acting as a binder, which is preferred from the viewpoint of its high reactivity with the solid particles.

The surface treatment of the solid particles with the above compound acting as a binder is conducted by, for example, the method selected from among:

(a) method in which the solid particles are dispersed in an appropriate dispersing medium, for example, an organic solvent such as an alcohol, the above compound acting as a binder is added to the resultant dispersion and reaction of the compound acting as a binder is carried out at temperatures not higher than the boiling point of the dispersing medium;

(b) method in which the solid particles are dispersed in a dispersing medium containing the compound acting as a binder; and (c) method in which, when the solid particle dispersion is a colloidal particle dispersion such as silica sol, the colloidal particle dispersion is charged directly (or according to necessity after substitution of the dispersing medium for an organic solvent) with the compound acting as a binder.

In the above surface treatment, the compound acting as a binder is preferably employed in an amount of 0.01 to 0.5 part by weight in terms of binder per part by weight of the solid particles. When the amount of the compound acting as a binder is less than 0.01 part by weight, occasionally the solid particles of the dispersion (I) mutually aggregate or precipitate in the liquid (II) at the time of spreading the dispersion (I) on the liquid (II). On the other hand, when the amount exceeds 0.5 part by weight, it is likely that a film is formed by excess binder, so that the formation of the particle layer is prevented.

In the present invention, the dispersion obtained in the surface treatment of the solid particles with the compound acting as a binder according to any of the above methods can be used as the dispersion (I). However, it is preferred that the dispersing medium of the above dispersion be substituted for an organic solvent such as a ketone, an ether or an aromatic solvent prior to use as the dispersion (I) from the viewpoint of the dispersibility of the solid particles and the volatility and evaporation of the dispersing medium after the spread of the dispersion (I) on the liquid (II).

Examples of the above organic solvents suitable for substituting the dispersing medium include methyl ethyl ketone, methyl isobutyl ketone, cyclohexane, dimethyl ether, diethyl ether, hexane, octane, toluene and xylene.

The concentration of solid particles in the dispersion (I) is preferred to range from 5 to 40% by weight. When this concentration is less than 5% by weight, the time required for removing the dispersing medium from the dispersion (I) spread on the liquid (II) might be prolonged. On the other hand, when the concentration exceeds 40% by weight, occasionally it is difficult to smoothly spread the dispersion (I) on the liquid (II) or the number of particles of the particle layer in the direction of the thickness thereof is locally varied the multiple particle layer is formed.

The liquid (II) used in the present invention has a specific gravity higher than that of the dispersing medium of the above dispersion (I) and being immiscible with the dispersing medium.

This liquid (II) is not particularly limited as long as it has a specific gravity higher than that of the above dispersing medium and is immiscible with the dispersing medium. However, water is preferred from the viewpoint that its handling is easy.

Figure 1B:
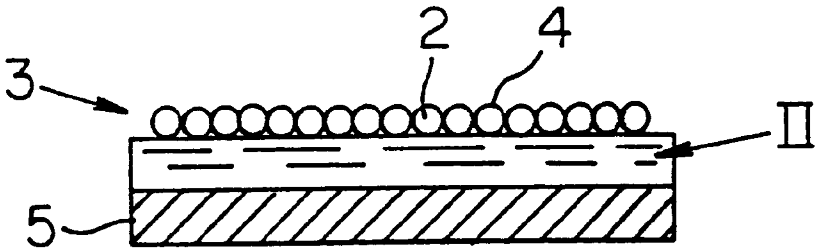
Figure 1C:
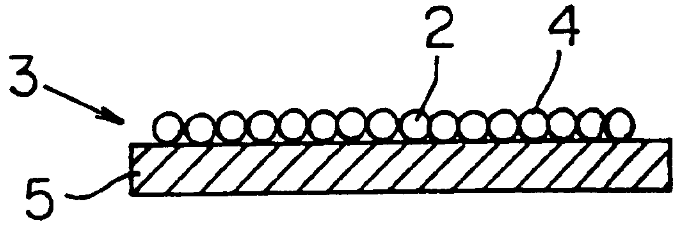

In the present invention, the particle layer is formed on the substrate through the following process.

i) The dispersion (I) is spread on the liquid (II) as shown in FIG. 1 (*a*) by, for example, the method in which the dispersion (I) is gently dropped on the liquid (II).

ii) The dispersing medium 1 of the dispersion (I) is removed by the method in which the interface between the dispersion (I) and the liquid (II) is not disordered. For example, the method of evaporating the dispersing medium 1 from the dispersion (I) at atmospheric or reduced pressure is employed for removing the dispersing medium 1. This removal of the dispersing medium 1 from the dispersion (I) on the liquid (II) causes the solid particles 2 to arrange on the liquid (II) during the period from the start of the removal of the dispersing medium 1 to the completion of the removal of the dispersing medium 1, so that the particle layer 3 is formed as shown in FIG. 1 (*b*).

iii) This particle layer on the liquid (II) is transferred onto a substrate to thereby form the particle layer 3 on the substrate 5 as shown in FIG. 1 (*c*).

The method of transferring the particle layer onto the substrate is not particularly limited as long as it does not damage the particle layer. For example, preferred is a method in which the substrate is previously sunk in the liquid bath containing the liquid (II) and lifted after the completion of the above step (ii) or another in which the substrate is previously sunk in the liquid bath containing the liquid (II) and the liquid (II) is gradually withdrawn from the liquid bath after the completion of the above step (ii).

iv) The substrate having the particle layer formed thereon is dried and according to necessity further heated, so that the solid particles constituting the particle layer adhere to each other by means of the binder and that further the binder bonds with the substrate to thereby realize excellent adherence between the particle layer and the substrate.

Method of Planarizing Irregular Surface of Substrate

Next, the method of planarizing an irregular surface of a substrate according to the present invention will be described in detail.

The method of planarizing an irregular surface of a substrate according to the present invention comprises forming a particle layer on an irregular surface of a substrate in the same manner as described above and thereafter removing parts of the particle layer formed on protrudent parts of the substrate to thereby planarize the irregular surface of the substrate.

The removal of the particle layer formed on protrudent parts of the substrate is carried out by, for example, polishing.

The above formation of a particle layer on an irregular surface of a substrate followed by removal of the particle layer formed on protrudent parts of the substrate causes the particle layer to remain embedded in and bonded by a binder to only recessed parts of the substrate, thereby planarizing the irregular surface of the substrate.

Particle-layer-formed Substrate

The particle-layer-formed substrate of the present invention comprises a substrate and, formed on its surface, the particle layer obtained according to the above method.

In the present invention, any type of substrate can be employed as long as the particle layer can be formed on its surface according to the above method. In particular, examples of the particle-layer-formed substrates of the present invention include:

- a high-density optical or magnetic disk having a particle layer formed thereon made from, for example, silica according to the above method;
- a CCD (charge coupled device) having a microlens made of a particle layer formed from, for example, titanium oxide according to the above method;
- a face-plate of display such as a CRT or a liquid crystal display unit having on its surface a particle layer formed from, for example, silica according to the above method;
- a semiconductor device having a multilevel interconnection structure obtained by forming an insulating particle layer of, for example, silica on nonwiring parts of each level according to the above method to thereby planarizing the step between wiring parts and nonwiring parts;
- a color-filter-formed transparent electrode plate for use in a color liquid crystal display device, obtained by forming an insulating particle layer of, for example, silica on a substrate surface having a color filter so as to planarize the step of the color filter area according to the above method; and
- a TFT (thin film transistor)-formed transparent electrode plate for use in a liquid crystal display device, obtained by forming an insulating particle layer of, for example, silica on a substrate surface having a protrudent TFT so as to planarize the step of the TFT area according to the above method.

All the above particle-layer-formed substrates of the present invention are excellent in the adherence between the particle layer and the substrate.

The high-density optical or magnetic disk having the above particle layer at its surface is excellent in texturing characteristics. The face-plate of display having the above particle layer at its surface is excellent in antireflection performance.

EFFECT OF THE INVENTION

The present invention provides the particle-layer-formed substrate having a highly adherent particle layer and enables forming a monoparticulate layer in which solid particles are regularly arranged on a substrate.

Further, the present invention enables forming the particle layer from any of various types of solid particles and thus enables obtaining a particle-layer-formed substrate having a high light transmission, a low haze and an excellent antireflection performance by forming a layer of suitable solid particles such as those of silica, titania or alumina on a substrate.

Still further, the present invention enables embedding the particle layer only in recessed parts of the substrate having irregular surface, so that the irregular surface of the substrate can be planarized.

EXAMPLE

The present invention will be described below with reference to the following Examples, which in no way limit the scope of the invention.

Example 1

20 g of polysilazane (PHPS (trade name) produced by Tonen Corp., concentration: 10 wt. %, solvent: xylene) was added to 100 g of commercially available organosilica sol (Oscal (trade name) produced by Catalysts & Chemicals Industries Co., Ltd., average particle size: 300 nm, concentration: 10 wt. %, solvent: ethanol) and heated at 50° C. for 5 hr to thereby surface treat the silica particles. Then, the solvent of the resultant dispersion was substituted for MIBK, thereby obtaining a 20% by weight silica particle dispersion. A lifting apparatus together with a glass plate mounted thereon was sunk in the water of a water vessel. 1 g of the above 20% by weight silica particle dispersion was dropped on the surface of the water and left undisturbed for 2 min. During this period, MIBK evaporated off, so that a monoparticulate layer of silica was formed on the surface of the water. Thereafter, the glass plate was gently lifted by the lifting apparatus, thereby transferring the monoparticulate layer of silica onto the glass plate. The resultant particle-layer-formed glass plate was heated at 300° C. for 30 min.

Figure 2:
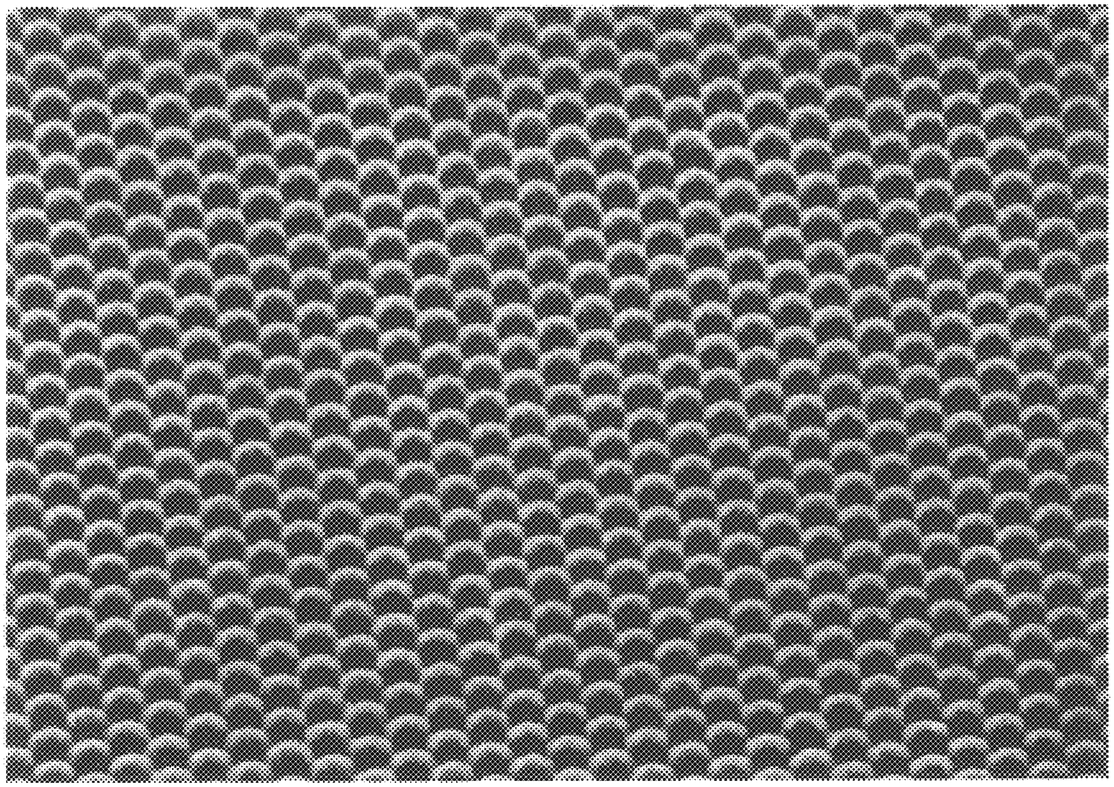
FIG. 2 is an electron micrograph showing the particulate structure of the monoparticulate layer part of the particle-layer-formed glass plate.

This particle-layer-formed glass plate was evaluated with respect to the monolayer formation in the particle layer, the adherence between the particle layer and the plate and the light transmission, the light reflectance and the haze of the particle-layer-formed glass plate in the following manners. An electron micrograph (15,000 magnification) of the monoparticulate layer part of the particle-layer-formed glass plate is shown in FIG. 2.

Monolayer formation in particle layer

The silica particle layer was observed by means of a scanning electron microscope and an optical microscope to find whether it is composed of a monolayer or multilayer. It was judged as being good when the proportion of multilayer parts is low.

Adherence of particle layer to plate

The tape peeling test was conducted and the condition of peeling of the silica particle layer was visually inspected.

Light transmission through particle-layer-formed glass plate

The light transmission at 550 nm was measured by the use of haze computer manufactured by Suga Test Instruments Co., Ltd.

Light reflection on particle-layer-formed glass plate

The light reflectance at 550 nm was measured by the use of spectrophotometer manufactured by Hitachi, Ltd.

Haze of particle-layer-formed glass plate

The diffused light transmission and parallel light transmission at 550 nm were measured by the use of haze computer manufactured by Suga Test Instruments Co., Ltd., and the haze was calculated by the formula:

$$Haze=(diffused\ light\ transmission/parallel\ light\ transmission)\times 100.$$

The results are shown in Table 1.

Example 2

A particle-layer-formed glass plate was produced in the same manner as in Example 1 except that 20 g of tetraethoxysilane (Ethyl silicate 28 (trade name) produced by Tama Chemicals Co., Ltd., concentration: 10 wt. %, solvent: ethanol) and 1 g of 30% by weight aqueous ammonia as a hydrolysis catalyst were added to 100 g of commercially available organosilica sol (Oscal (trade name) produced by Catalysts & Chemicals Industries Co., Ltd., average particle size: 300 nm, concentration: 10 wt. %, solvent: ethanol) and heated at 50° C. for 10 hr to thereby surface treat the silica particles and then the solvent of the resultant dispersion was substituted for MIBK, thereby obtaining a 20% by weight silica particle dispersion. This particle-layer-formed glass plate was evaluated with respect to the monolayer formation in the particle layer, the adherence between the particle layer and the plate and the light transmission, the light reflectance and the haze of the particle-layer-formed glass plate.

The results are shown in Table 1.

Example 3

A particle-layer-formed glass plate was produced in the same manner as in Example 1 except that 20 g of dibutoxybisacetylacetonatotitanium (TC-100 (trade name) available from Matsumoto Trading Co., Ltd., concentration: 10 wt. %, solvent: ethanol) was added to 100 g of commercially available organosilica sol (Oscal (trade name) produced by Catalysts & Chemicals Industries Co., Ltd., average particle size: 300 nm, concentration: 10 wt. %, solvent: ethanol) and heated at 50° C. for 1 hr to thereby surface treat the silica particles and then the solvent of the resultant dispersion was substituted for MIBK, thereby obtaining a 20% by weight silica particle dispersion. This particle-layer-formed glass plate was evaluated with respect to the monolayer formation in the particle layer, the adherence between the particle layer and the plate and the light transmission, the light reflectance and the haze of the particle-layer-formed glass plate.

The results are shown in Table 1.

Example 4

A particle-layer-formed glass plate was produced in the same manner as in Example 1 except that 20 g of dibutoxybisacetylacetonatotitanium (TC-100 (trade name) available from Matsumoto Trading Co., Ltd., concentration: 10 wt. %, solvent: ethanol) was added to 100 g of commercially available titania sol (Neosunveil (trade name) produced by Catalysts & Chemicals Industries Co., Ltd., average particle size: 15 nm, concentration: 10 wt. %, solvent: ethanol) and heated at 50° C. for 1 hr to thereby surface treat the titania particles and then the solvent of the resultant dispersion was substituted for MIBK, thereby obtaining a 20% by weight titania particle dispersion. This particle-layer-formed glass plate was evaluated with respect to the monolayer formation in the particle layer, the adherence between the particle layer and the plate and the light transmission, the light reflectance and the haze of the particle-layer-formed glass plate.

The results are shown in Table 1.

Example 5

A particle-layer-formed glass plate was produced in the same manner as in Example 1 except that 20 g of aluminum stearate (concentration: 10 wt. %, solvent: ethanol) was added to 100 g of commercially available alumina sol (Cataloid-AS (trade name) produced by Catalysts & Chemicals Industries Co., Ltd., average particle size: 10×100 Å, concentration: 10 wt. %, solvent: ethanol) and heated at 50° C. for 1 hr to thereby surface treat the alumina particles and then the solvent of the resultant dispersion was substituted for MIBK, thereby obtaining a 10% by weight alumina particle dispersion. This particle-layer-formed glass plate was evaluated with respect to the monolayer formation in the particle layer, the adherence between the particle layer and the plate and the light transmission, the light reflectance and the haze of the particle-layer-formed glass plate.

The results are shown in Table 1.

Example 6

A particle-layer-formed glass plate was produced in the same manner as in Example 1 except that 20 g of polysilazane (PHPS (trade name) produced by Tonen Corp, concentration: 10 wt. %, solvent: xylene) was added to 100 g of commercially available latex dispersion (Microgel (trade name) produced by NIPPON PAINT CO., LTD., average particle size: 300 nm, concentration: 10 wt. %, solvent: ethanol) and heated at 50° C. for 5 hr to thereby surface treat the latex particles and then the solvent of the resultant dispersion was substituted for MIBK, thereby obtaining a 10% by weight latex particle dispersion. This particle-layer-formed glass plate was evaluated with respect to the monolayer formation in the particle layer, the adherence between the particle layer and the plate and the light transmission, the light reflectance and the haze of the particle-layer-formed glass plate.

The results are shown in Table 1.

Comparative Example 1

A particle-layer-formed glass plate was produced in the same manner as in Example 1 except that the solvent of commercially available organosilica sol (Oscal (trade name) produced by Catalysts & Chemicals Industries Co., Ltd., average particle size: 300 nm, concentration: 10 wt. %, solvent: ethanol) was substituted for MIBK, thereby obtaining a 20% by weight silica particle dispersion. This particle-layer-formed glass plate was evaluated with respect to the monolayer formation in the particle layer, the adherence between the particle layer and the plate and the light transmission, the light reflectance and the haze of the particle-layer-formed glass plate.

The results are shown in Table 1.

Comparative Example 2

A particle-layer-formed glass plate was produced in the same manner as in Example 1 except that the solvent of commercially available latex dispersion (Microgel (trade name) produced by NIPPON PAINT CO., LTD., average particle size: 300 nm, concentration: 10 wt. %, solvent: ethanol) was substituted for MIBK, thereby obtaining a 20% by weight latex particle dispersion. This particle-layer-formed glass plate was evaluated with respect to the monolayer formation in the particle layer, the adherence between the particle layer and the plate and the light transmission, the light reflectance and the haze of the particle-layer-formed glass plate.

The results are shown in Table 1.

TABLE 1

| | Particle layer | | Particle-layer-formed glass plate | | |
|---|---|---|---|---|---|
| | Monolayer | Adherence to plate | Light transmission (%) | Reflectance (%) | Haze (%) |
| Ex. 1 | Good | Good | 95 | 0.8 | 0.9 |
| Ex. 2 | Good | Good | 94 | 0.9 | 1.0 |
| Ex. 3 | Good | Good | 95 | 0.9 | 0.9 |
| Ex. 4 | Good | Good | 90 | 7.5 | 0.3 |
| Ex. 5 | Good | Good | 92 | 4.8 | 0.0 |
| Ex. 6 | Good | Good | 92 | 5.3 | 1.4 |
| Comp Ex. 1 | Poor | Poor | 93 | 1.5 | 1.4 |
| Comp Ex. 2 | Good | Poor | 90 | 5.5 | 1.9 |

It is apparent from Table 1 that the particle-layer-formed substrate of the present invention is excellent in the adherence between the particle layer and the substrate and that the particle layer is in the state of a uniform monolayer in which the particles are regularly arranged.

Further, it is apparent that the particle-layer-formed substrate of the present invention exhibits high optical performance and is suitable for use as a high-density recording optical or magnetic disc, a CCD, an optical device or a face-plate of display of CRT or liquid crystal display device.

Example 7

20 g of polysilazane (PHPS (trade name) produced by Tonen Corp., concentration: 10 wt. %, solvent: xylene) was added to 100 g of commercially available organosilica sol (Oscal (trade name) produced by Catalysts & Chemicals Industries Co., Ltd., average particle size: 300 nm, concentration: 10 wt. %, solvent: ethanol) and heated at 50° C. for 5 hr to thereby surface treat the silica particles. Then, the solvent of the resultant dispersion was substituted for MIBK, thereby obtaining a 20% by weight silica particle dispersion. Using as a substrate a semiconductor model device in which a wiring step height of 0.6 μm was formed, a semiconductor device carrying a monoparticulate layer of silica was prepared through a step of heating at 300° C. for 30 min in the same manner as in Example 1.

This particle-layer-formed semiconductor device was set on a polishing apparatus, by which the silica particles on the wiring were selectively polished away, followed by formation of an interlayer insulating film of silica and an upper-layer wiring.

A section of the thus formed multilevel interconnection structure was observed by a scanning electron microscope and it was found that the above interlayer insulating film of silica had excellent planarization.

We claim:

1. A method of forming a particle layer on a substrate, which comprises the steps of spreading a dispersion (I) comprising a dispersing medium and, dispersed therein, solid particles, the surface of said particles including a compound acting as a binder on a liquid (II) having a specific gravity higher than that of the dispersion medium, said liquid (II) being immiscible with the dispersing medium, subsequently removing the dispersing medium from the dispersion (I) to thereby arrange the solid particles on the liquid (II) so that a particle layer is formed on the liquid (II) and thereafter transferring the particle layer onto a substrate.

2. A particle-layer-formed substrate comprising a substrate and, superimposed on a surface thereof, the particle layer obtained by the method as claimed in claim 1.

3. A particle-layer-formed substrate as claimed in claim 2, wherein the substrate is dried and heat-treated after the particle layer is transferred.

4. A method of forming a particle layer on a substrate as claimed in claim 1, which further comprises, after transferring the particle layer onto the substrate, the step of drying and heat-treating the substrate.

5. A method of planarizing an irregular surface of a substrate, which comprises the steps of spreading a dispersion (I) comprising a dispersing medium and, dispersed therein, solid particles, the surface of said solid particles including a compound acting as a binder on a liquid (II) having a specific gravity higher than that of the dispersing medium, said liquid (II) being immiscible with the dispersing medium, subsequently removing the dispersing medium from the dispersion (I) to thereby arrange the solid particles on the liquid (II), then transferring the particle layer onto an irregular surface of a substrate having protrudent and recessed parts and thereafter removing parts of the particle layer formed on the protrudent parts of the substrate to planarize the irregular surface of the substrate.

6. A particle-layer-formed substrate comprising a substrate and, superimposed on a surface thereof, the particle layer obtained by the method as claimed in claim 5.

7. A particle-layer-formed substrate as claimed in claim 6, wherein the substrate is dried and heat-treated after the particle layer is transferred, and before the particle layer is removed from the protrudent parts.

8. A method of forming a particle layer on a substrate as claimed in claim 5, which further comprises, after transferring the particle layer onto the irregular surface of the substrate and before the particle layer is removed from the protrudent parts, the step of drying and heat-treating the substrate.

* * * * *